United States Patent [19]

Bauer

[11] Patent Number: 5,107,746
[45] Date of Patent: Apr. 28, 1992

[54] SYNTHESIZER FOR SOUNDS IN RESPONSE TO THREE DIMENSIONAL DISPLACEMENT OF A BODY

[76] Inventor: Will Bauer, 11514-77 Ave., Edmonton, Alberta, Canada, T6G 0M1

[21] Appl. No.: 484,985

[22] Filed: Feb. 26, 1990

[51] Int. Cl.⁵ .............................................. G10F 1/00
[52] U.S. Cl. ....................................... 84/626; 84/687
[58] Field of Search ................. 84/626, 600, 645, 687; 342/106, 107, 457, 458

[56] References Cited

U.S. PATENT DOCUMENTS

| | | | |
|---|---|---|---|
| 3,699,234 | 10/1972 | Adachi | 84/687 |
| 3,705,948 | 12/1972 | Tomisawa | 84/687 |
| 3,953,856 | 4/1976 | Hammack | 342/126 |
| 3,996,590 | 12/1976 | Hammack | 342/465 |
| 4,526,078 | 7/1985 | Chadabe | 84/602 |
| 4,843,568 | 6/1989 | Krueger et al. | 358/93 |

Primary Examiner—Stanley J. Witkowski
Assistant Examiner—Helen Kim
Attorney, Agent, or Firm—Jane Parsons & Associates

[57] ABSTRACT

A system is provided for tracking the three-dimensional position of an object within a three-dimensional region by triangulation techniques to generate signals corresponding to such three-dimensional positions. The signals may be used to drive a music synthesizer. Triangulation may be by the use of at least three spaced apart ultrasound emitters cooperating with ultrasound receivers located on a body moving in the three-dimensional region. The position of each ultrasound receiver is calculable by triangulation from data from ultrasound pulses received by the receiver from the emitters. A sound map may be made of the region so that similar signals may drive the synthesizer differently for different sub-regions.

8 Claims, 6 Drawing Sheets

SYNTHESIZER FOR SOUNDS IN RESPONSE TO THREE DIMENSIONAL DISPLACEMENT OF A BODY

BACKGROUND OF THE INVENTION

1. Field of the Invention

This invention relates to a system for producing sound in response to movement of a body in three-dimensional space. The invention especially relates to the conversion of movement of a body to make music.

2. Background of the Invention

At least as early as 1924, interest was being shown in the concept of making sound in response to the position of an object in space and, in 1928 a U.S. Pat. No. 1,661,058 issued to Theremin for a method and apparatus for generating sound. Theremin's apparatus comprised active oscillator elements which reacted to the passive presence of a body and the environment to produce audible sound. That apparatus bears little resemblance to more recent applications of the concept.

Much more recently, due, perhaps, to the emergence of music synthesizer technology and computer technology, advances have been made in the conversion of movement to music. Usually the movement is human movement.

Exemplary prior art in the field is a variety of U.S. patents and other published articles. Zwosta in U.S. Pat. No. 4,627,324 issued Dec. 9, 1986 teaches the concept of attaching transducer devices to various parts of the human body, which devices generate signals in response to motion of the associated body part and the signals are converted to music. The transducers are motion sensitive devices. Niinomi in U.S. Pat. No. 3,704,339 issued Dec. 12, 1972 uses devices responsive to movement caused by muscle expansion or contraction to effect playing of an electronic musical instrument. Chadabe in U.S. Pat. Nos. 4,526,078 and 4,716,804 respectively issued Jul. 2, 1985 and Jan. 5, 1988 are merely computerized versions of the Theremin technique. Veitch in U.S. Pat. No. 4,739,400 issued on Apr. 19, 1988 uses optical means to determine the position of a person within a monitored area and uses that information to synthesize music. Also exemplary subject matter in the field are the subject matter of U.S. Pat. No. 4,043,241 issued Aug. 23, 1977 to Liu which discloses a plurality of music producing keys on the underside of a shoe and U.S. Pat. No. 4,662.260 issued May 5, 1987 to Rumsey which discloses a sound producing device producing different notes when rotated.

Another previous project utilizing visual means for providing positional information concerning a performer was carried out by Professor Collinge in conjunction with the E.D.A.M. Performing Arts Society. This project, the "Occulus Renae", consisted of a video camera connected through a digitizer to a computer. The camera was mounted over the top of a stage area in which a dancer performed. The motions of the dancer as viewed from above were used to trigger synthesizers in accordance with various algorithms programmed into the computer. The image produced was two-dimensional and only a single "indication of motion", parameter was used.

Another, somewhat related project was one which controlled and manipulated prerecorded or sequenced sounds rather than actually generating sounds. This project was carried out by Michel Waisvisz in 1986 and concerned a device worn by a performer which senses relative position and orientation and controls pitch, timbre and selection of synthesizer patches through the M.I.D.I. (Musical Instruments Digital Interface) protocol. This device requires hard wiring between the performer and the computer and the use of cables seriously limits the mobility of the performer.

SUMMARY OF THE INVENTION

The present inventor attempted to devise a system utilizing means for detecting the absolute position of a moving object or parts of a moving object such as the limbs of a human performer in three-dimensional space utilizing very simple position indicating means with a view to simplicity of hardware and software. The novel concept of using sound waves from four reference points to pinpoint the position of a performer by triangulation calculations was evolved.

Accordingly, there is provided a system for converting movement of an object within a three-dimensional region to sound, comprising triangulation means for measuring sequential three-dimensional positions of an object in a three-dimensional region; means for producing signals corresponding to established three-dimensional positions; and means for driving a music synthesizer through said signals.

The system may comprise at least three digital ultrasound emitters located respectively at three reference points for triangulation determination of the three-dimensional position of said object; at least one ultrasound receiver associated with said object to move in the three-dimensional region; a pulse detector associated with the ultrasound receiver to detect pulses received thereby; a pulse encoder associated with the detector to encode detected pulses into a form suitable for radio transmission; a radio transmitter associated with the encoder and a radio receiver remote from said object, the radio transmitter being adapted to transmit data corresponding to detected pulses to the radio receiver; a pulse decoder associated with the radio receiver to decode transmitted pulses into a form suitable for the microprocessor controller to detect; a microprocessor controller adapted to send signals to the ultrasound emitters to initiate emission of ultrasound pulses therefrom, to measure elapsed time between the emission of an ultrasound pulse from respective ultrasound emitters and a detected pulse corresponding thereto, to calculate radial positional data for the object from the elapsed times for pulses from each of the emitters and the object, and to generate position indicating signals; and computer means interfaced with the microprocessor controller for receiving said position indicating signals therefrom, computing the three-dimensional position, velocity and acceleration of the object, and generating commands for a sound synthesizer in response to said three-dimensional position, velocity, and acceleration data.

In practice, it is found that four ultrasound emitters are preferred since the object itself may be capable of blocking reception of pulses. If four emitters are used the possibility of blocking more than one emitter is diminished. Additionally, four emitters allow some error correction; since only three speakers are required for triangulation. There are several ways to calculate a position based on different triplets of speakers. This allows one to detect and reject timing errors, resulting in higher positional accuracy.

Any high frequency sound above the audible range may be used. Each of three speakers may emit sound pulses of approximately 1 to 4 milliseconds duration each. The pulses may be emitted on the command of a microprocessor based controller. The detection of a pulse at an object which is to be tracked is communicated back to the microprocessor by a radio link. The microprocessor may then measure the amount of time that elapses between the emission and reception of a pulse. This time varies directly with the distance of the sound receiver from the speaker and so gives a measurement of the distance between the two. Four speakers are used so as to be able to gain a measure of distance between the receiver and four known reference points. This allows one to determine the absolute position of the receiver in three dimensions by triangulation. Four speakers are used instead of three in order to improve the accuracy and consistency of measurement.

It is possible to measure variables consisting of distance, velocity and acceleration in each of the three spatial dimensions. Thus, for one calculation, nine separate quantities are measured, three for each dimension.

Any object to be tracked has a receiver or sensor attached to it. Several sensors, for example four, may be tracked by the system. The frequency of measurement of the position of the sensor may be about 10–300 times per second. The spatial resolution of the system may be between $\frac{1}{4}''$ and 1''. Thus, the state of several objects, or different parts of the body, may be sampled continuously at about 30 times per second with spatial resolution of around $\frac{1}{2}''$ in each of the three spatial dimensions.

An important feature of the invention is the ability of the system to produce different musical sounds according to the location of the performer in different sub-regions. A computer program is provided to make a map which is defined as the classification in computer memory of the position, velocity, and acceleration indicating signals in accordance with user specified areas or sub-regions. According to the classification or map of the sub-regions the position indicating signals are mapped according to various relations onto M.I.D.I. commands which are then sent to the sound synthesizers, producing different sounds. By this means a gesture of the performer in one part of the stage may generate a completely different sound from the same gesture made in another part of the stage.

Each ultrasound receiver is preferably a microphone array each having its own pulse detector and encoder. A mixer is then provided to combine all the encoded pulses before radio transmission.

BRIEF DESCRIPTION OF THE DRAWINGS

An embodiment of the invention will now be described by way of example with reference to the drawings, in which.

DETAILED DESCRIPTION OF A PREFERRED EMBODIMENT

Figure 1:
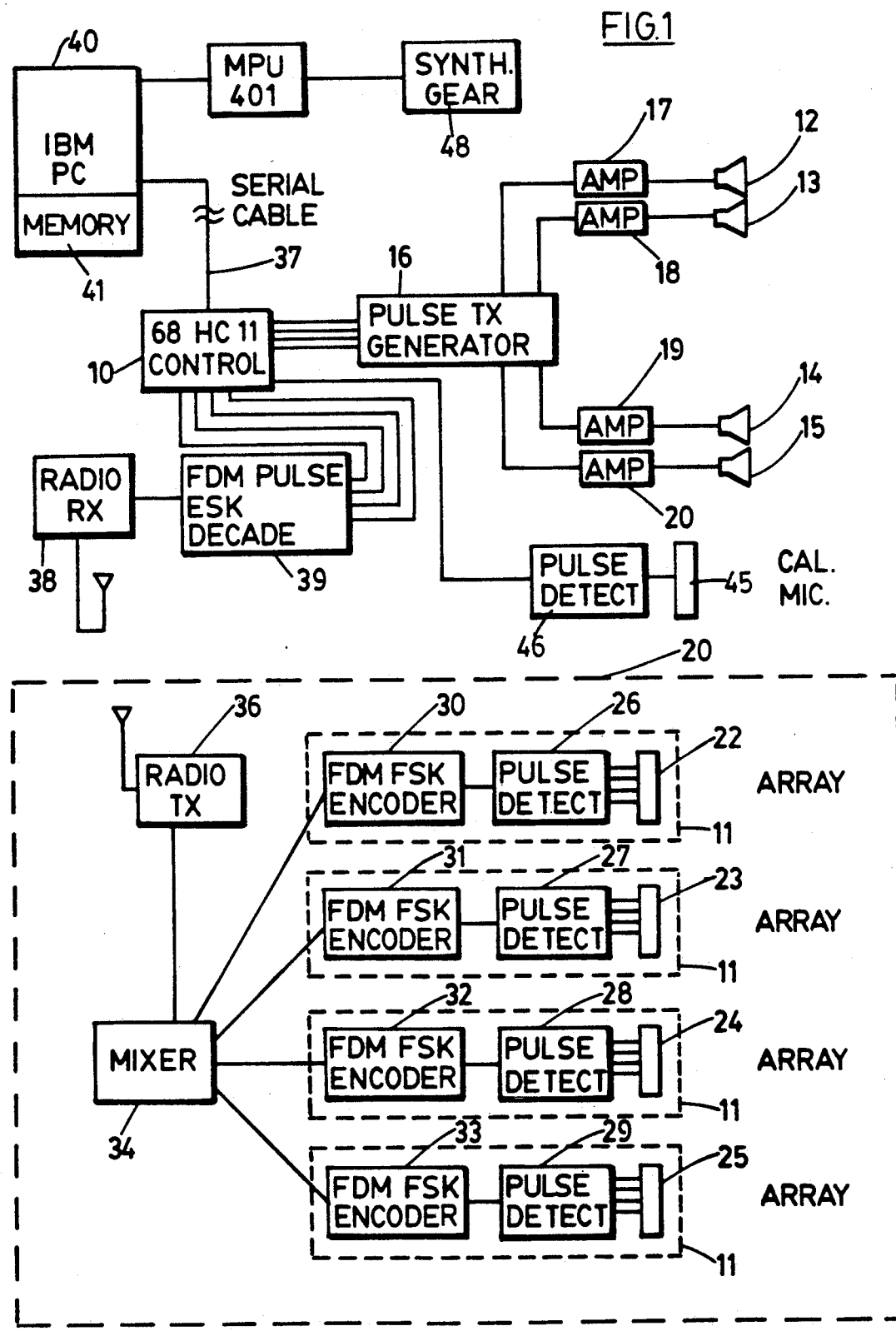
FIG. 1 is a block diagram of one system according to the invention.

The figure shows a microprocessor controller 10 which sends signals to each of speakers 12, 13, 14 and 15 causing them to emit sound pulses of approximately 1 to 4 milliseconds duration each. The sound pulses should be of sufficiently high frequency to be above the level of audible sound. A frequency range of 20 KHz to 30 KHz is suitable. The pulses may be generated by any suitable means 16 and be subjected to amplification by amplification means 17, 18, 19, and 20 for respective speakers 12, 13, 14, 15.

Each of the speakers 12, 13, 14 and 15 is located at a specific inertial reference point forming a base for triangulation to determine the position of a moving object, usually a human body, within a three-dimensional region.

A human performer within the three-dimensional region may have microphone arrays attached to various parts of his body. For example, four microphone arrays may be used, one for each arm and one for each leg. The microphones will usually be located on that part of the limb subject to maximum movement. For example, the microphone arrays 22, 23, 24, 25 for the arm may be located at or near the hand. Each microphone array may be provided with a casing for discrete placing on a human body. This assembly comprises wand 11. The casing may be a bracelet or anklet which comprises the wand 11 and is linked by a cable to a pulse detector 26, 27, 28, 29, encoder 30, 31, 32, 33 and hence to transmitter 36. The pulse detector and encoder associated with each microphone may be in the wand as shown or may be spaced from the wand by their cabling.

An ultrasound signal from any of speakers 12, 13, 14 or 15 will go to each of microphone arrays 22, 23, 24 and 25. The source speaker of each received signal may be identified by reference to the time frame in which it was emitted. The time from emission to detection for each microphone array will be dependent on its distance from the speaker. Pulse emission times can be stagged so that it is clear which detected pulse came from which speaker. Alternatively pulses may be identified by frequency.

The microphone arrays 22, 23, 24, 25 are connected to a detection circuit 26, 27, 28, 29 respectively for detecting a pulse generated the pulse generator. Detection may be by any convenient means. For example, pulse detector may consist of a filter, threshold detector and integrator. The filter allows only ultrasound frequencies to pass unattenuated to the threshold detector. The threshold detector generates a pulse when the amplitude of the signal is above a certain magnitude. Those pulses pass to the integrator which acts as a low pass filter to ensure the only pulses longer than a certain minimum duration get passed to the microprocessor. Alternatively each pulse may be identified by frequency measurement. An encoder converts the detected pulse into a form suitable to radio frequency modulation and each detector is provided with pulse encoder 30, 31, 32, 33 respectively. Coded pulses are fed to the mixer 34. A radio transmitter 36 is connected to the mixer circuit to transmit each pulse from mixer 34 to a radio receiver 38 connected to the microprocessor controller 10 through the decoder 39. Both the mixer 34 and the transmitter 36 are located on the human body also.

The microprocessor 10 then measures the amount of time that elapses between the emission and reception of a pulse. This time varies directly with the distance of each wand from the speaker and so gives a measurement of the distance between the two. This is done for each of the four speakers 12, 13, 14, 15 producing four timing measurements for each wand 11. This information is then used to calculate the radial position of each wand, relative to each speaker by dividing the time measurement by an appropriate calibration constant.

The calibration microphone 45 and pulse detector 46 enable the determination of this constant for all temperatures and humidities. The calibration microphone 45 is at a known distance from the speakers 12, 13, 14, 15 so knowledge of the time from a pulse's transmission to its detection at the calibration microphone allows a direct calculation of this constant. These four radial coordinates are then transmitted by a serial communications port 37 to a PC computer 40 for processing and/or storage. A program for running the controller 10 is straightforward and, once the concept of using high frequency sound as a locator means for a moving object is accepted, well within the scope of a man skilled in the art. The controller 10 may be, for example, a 68HC11 microprocessors chip manufactured by Motorola.

Position indicating signals calculated by the microprocessor controller pass to computer means 40 which may suitably be a microcomputer of the personal computer type.

The computer 40 is provided with software to enable the user to make a map of sub-regions its memory 41 in which movement will take place. This sound map is a map which specifies how certain physical gestures will be interpreted musically in each sub-region of the performance space. A sound map consists of several "layers". Each layer occupies the entire length and width of the performance space as well as a user specified range of heights. Associated with each layer is a single mapping relation specifying the following:

1. Which of the nine spatial "state" variables (position, velocity, and acceleration in each of the three spatial dimensions) will be mapped to what byte of what M.I.D.I. command.
2. What is the relation governing this mapping.

Sub-regions are defined by specifying which areas of a layer are to be actively mapped into sound using the associated mapping relation. This is done by drawing two dimensional shapes (which are assumed to extend over the range of valid heights specified for the layer) within the layer. The areas filled by these shapes are regions in which the mapping relation will be utilized to generate sound. If the performer is not in a filled area, no sound will be generated using the layers mapping relation.

Figure 3:
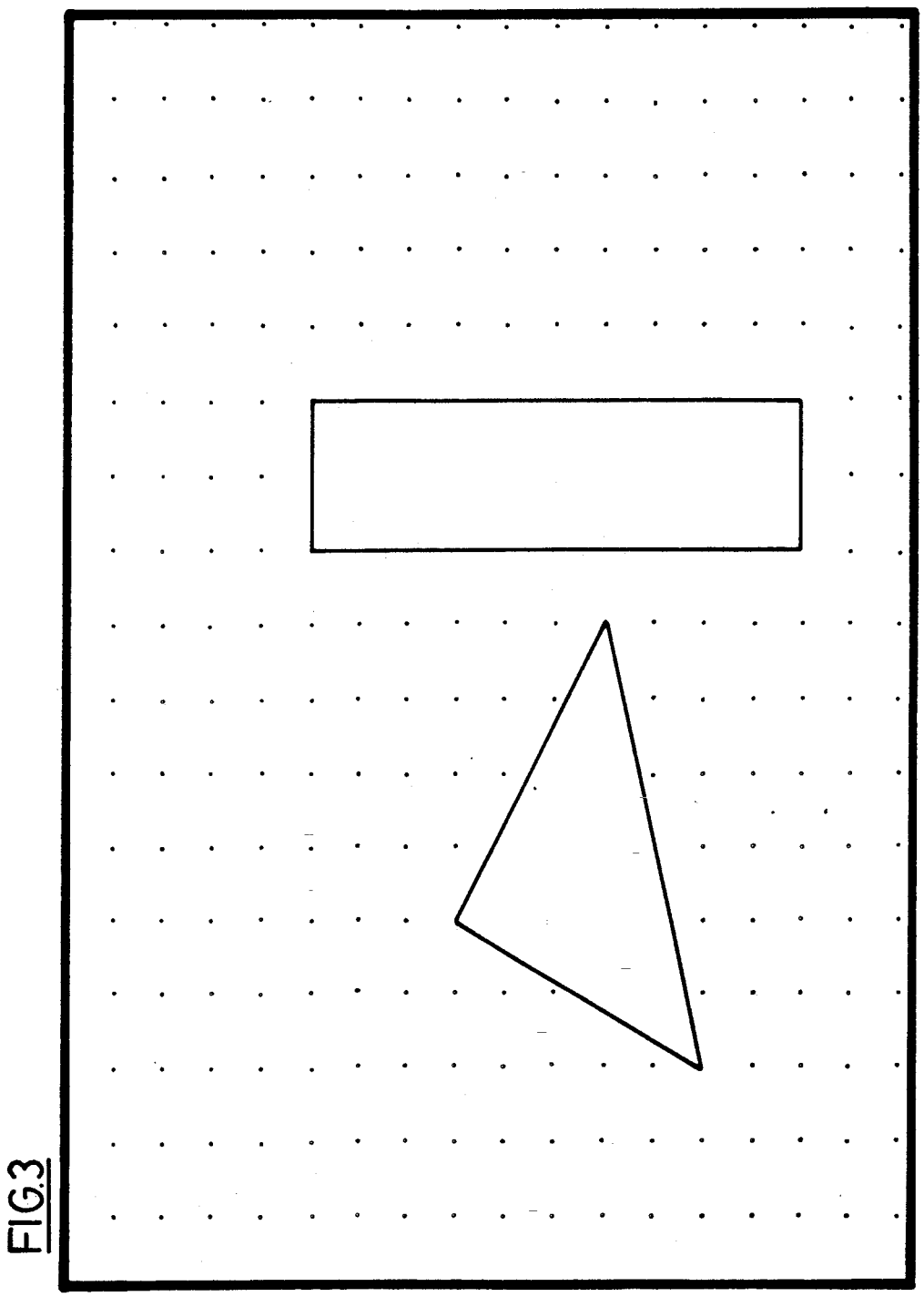
FIGS. 3, 4, 5, and 6 show a map editing.
Figure 4:
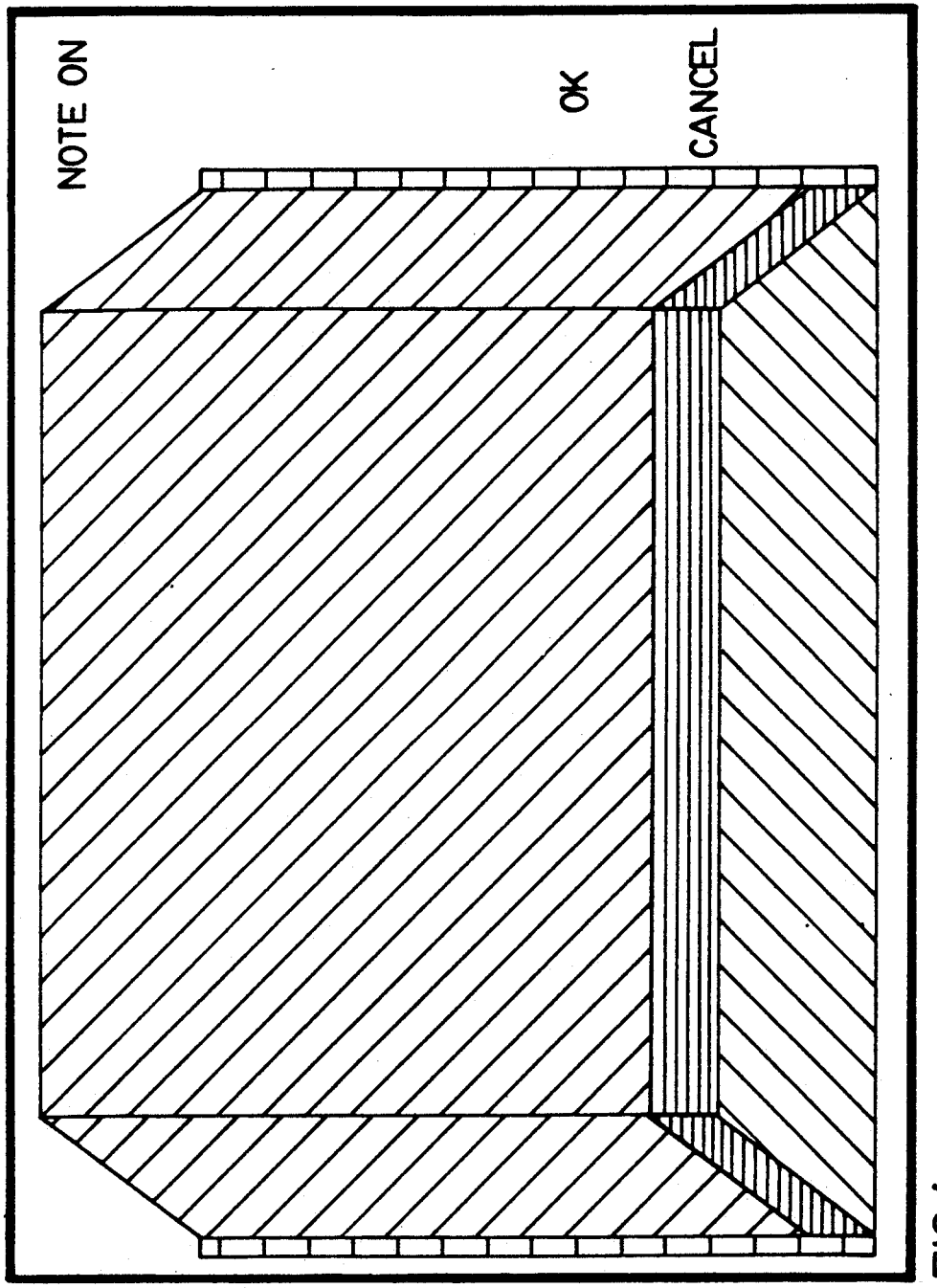
Figure 5:
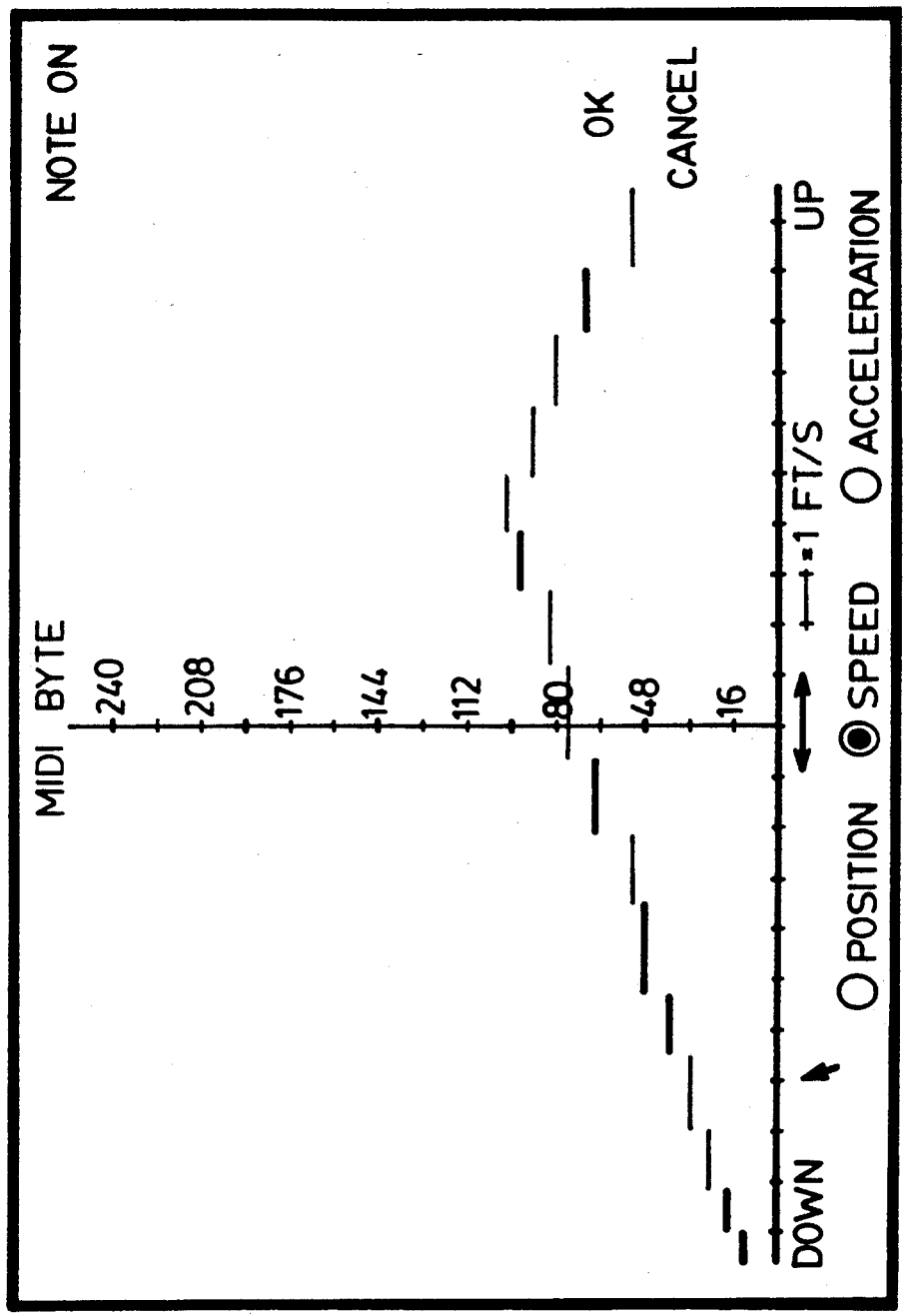
Figure 6:
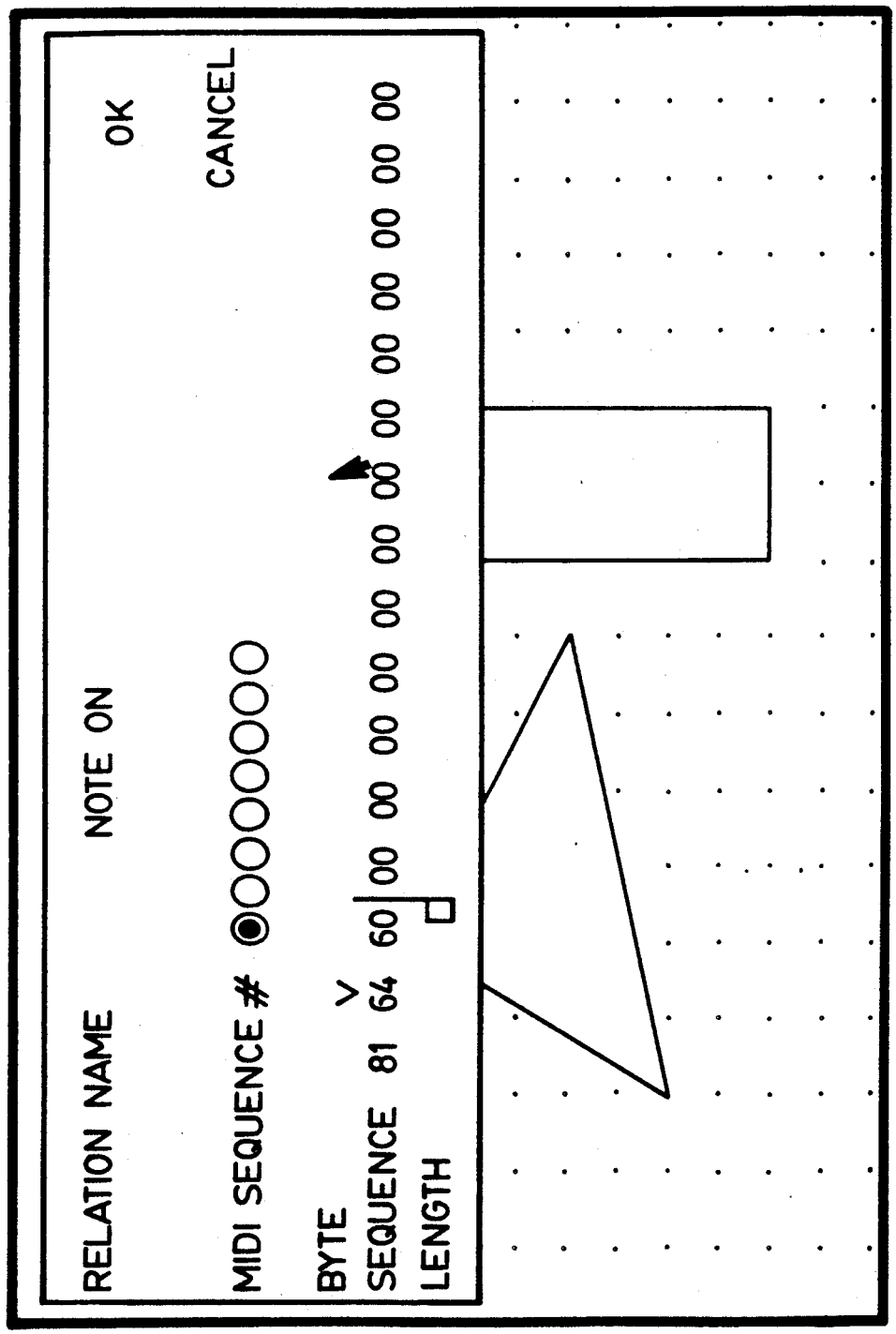

FIGS. 3, 4, 5, and 6 are examples of the editing process for a layer. In FIG. 3, a triangle and a rectangle specify where the mapping is to be applied within the performance area. The dots in the image are a grid, superimposed for editing purposes, which has no effect on the map when it is in use. FIG. 4 shows for what range of heights the layer is valid; in this case it is the horizontal hatched section, along and near the floor (diagonal cross hatching) of the performance space. FIG. 5 shows the M.I.D.I. command that will be mapped to. The "V" indicates the byte of the command that will be changed by the mapping. In this case we are mapping velocity in the vertical direction to the pitch (note) byte of a "Note On" M.I.D.I. command. FIG. 6 shows just what the mapping relation will be; the note value will vary in a stepwise manner with vertical-direction velocity. Thus, for this layer, whenever the performer is either within the solid triangle or on the lines around the unfilled rectangle, his velocity will generate M.I.D.I. "Note On" commands. The note turned on will be determined by the vertical-direction velocity as per FIG. 6.

Many layers can be specified per map which, when taken together, generate a number of musical actions as one moves about the performance space. It should be noted that any layer can have active sub-regions occupying all or part of the same physical volume as another layer.

The computer 40 is also provided with real-time processing software. The processing software allows musical interpretations of the movement which depend on the current set of measurements of acceleration, velocity and distance in each of the three spatial dimensions measured by the microprocessor controller as a result of the high frequency sound pulses emitted from each of the speakers 12, 13, 14, 15 and at the four reference locations.

For example, it may be desirable to associate the performer's position in a four square meter area of the stage with the ability to control the timbre of the sounds by the velocity at which he moves his hands. In another area which may or may not be of the same size, it may be desirable to make the spatial distribution of the sound between the different music producing speakers dependent on hand position of the performer. The velocity based control of the timbre may be retained during this additional control. Thus, a number of different mappings of motion into music may be set up, and cross-fades may be established between the sub-regions. The performer may then move from one to another sub-region expressing different musical results by similar movements.

A separate layer of the sound map is set up for each spatial-to-sound relation it is desired to specify. When the performer moves in performance area, the effect will be that of moving through all the active sub-regions at once, as if they had been superimposed on one another to form a single composite map of the space. This superposition of relationships allows production of a rich variety of complex and interesting control structures.

Figure 2:
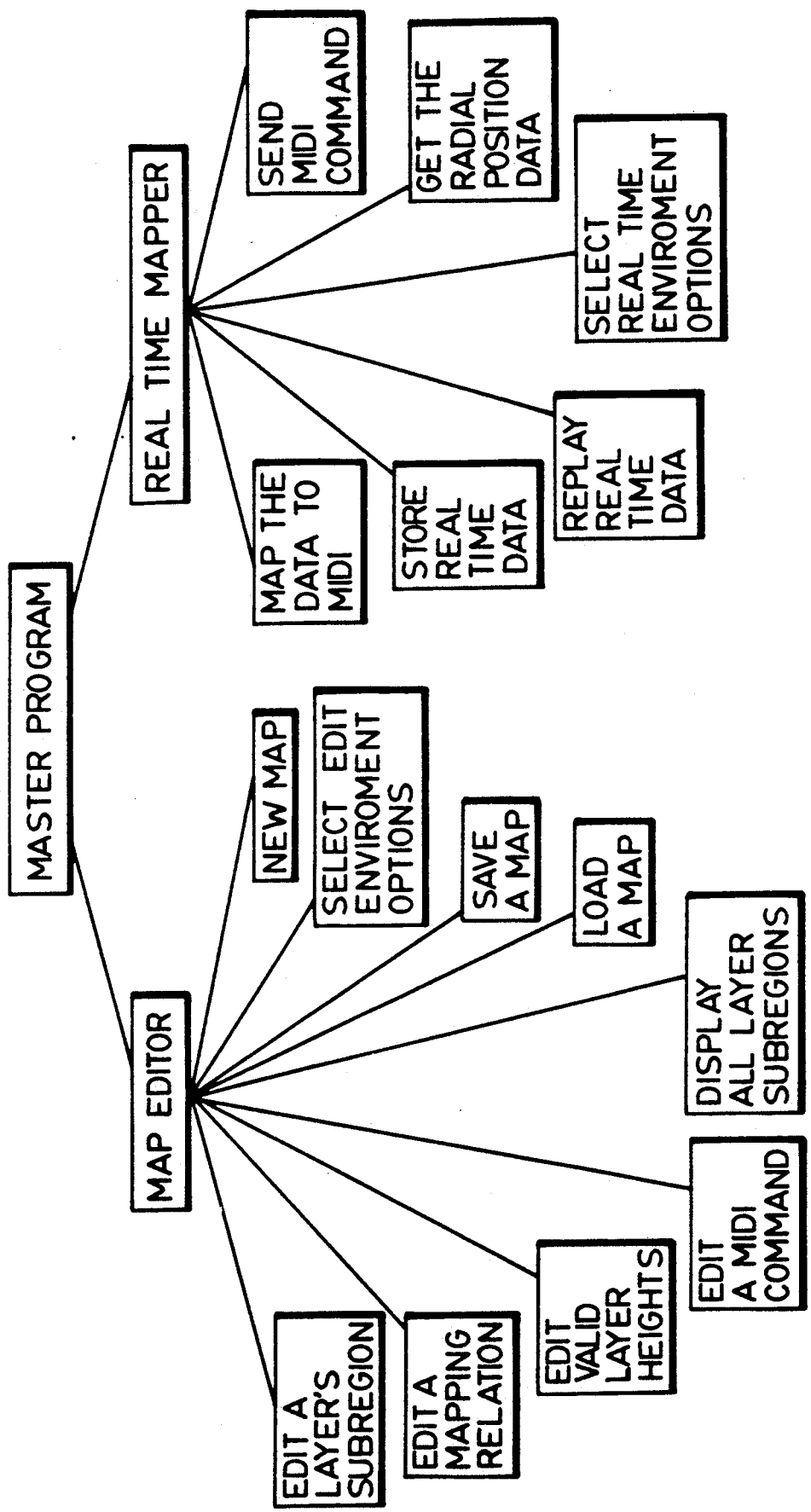
FIG. 2 is a block diagram of the software design for map generation.

FIG. 2 shows a block diagram detailing the functional modules of the overall P.C. software design. In "Map Editor" mode, the user can edit a new sound map, load an existing one from disk, and save the current map to disk. Layer sub-regions, layer heights, mapping relations, and M.I.D.I. commands can all be edited.

In performance real-time mode, the generated map or maps may be used with a musical instrument digital interface (M.I.D.I.). A software module for the computer 40 allows the computer to poll the positional information data at regular intervals, for example 30 times per second. On the basis of the sound map in use and the positional information signals different commands will be issued via M.I.D.I., thereby generating different sounds from the music synthesizer 48. Incoming data may be stored to disk, allowing a performance to be recorded for later replaying.

Programs for suitable software modules are set out in Appendix A hereto. One suitable programming language for the computer software is Turbo Pascal, but any suitable language may, of course, be used.

I claim:

1. A system for converting movement of an object within a three-dimensional region to sound, comprising:
    at least three ultrasound emitters located respectively at inertial reference points for triangulation determination of a position of said object;
    at least one array of ultrasound receivers attached to said object to move with the object in the three-dimensional region;

a pulse detector connected to each array of ultrasound receivers to detect pulses received thereby;

a pulse encoder associated with the detector to encode detected pulses into a form suitable for radio transmission;

a mixer connected to receive output from the encoder(s);

a radio transmitter connected to the mixer to transmit radio data corresponding to detected pulses;

a radio receiver remote from each radio transmitter but associated therewith to receive radio data therefrom;

a pulse decoder connected to the radio receiver to decode transmitted pulses into a form suitable for microprocessor detection;

a microprocessor controller interfaced with the decoder for the detection of pulses and interfaced with the ultrasound emitters to send pulses thereto and to initiate emission of ultrasound pulses therefrom, to measure elapsed time between the emission of an ultrasound pulse from respective ultrasound emitters and a detected pulse corresponding thereto, to calculate data as to the orientation of the object from the elapsed times for pulses from each of the emitters to each of the receivers of an array, and to generate position indicating signals for the object; and a computer interfaced with the microprocessor controller for receiving said position indicating signals therefrom, computing the three-dimensional position, velocity, and acceleration of the object in the three-dimensional region, and generating commands for a sound synthesizer in response to said position, velocity, and acceleration data.

2. A system as claimed in claim 1 in which means is provided to store a map as herein defined of the different three-dimensional sub-regions in computer memory, the map being addressed by the position indicating signals.

3. A system as claimed in claim 2 in which the ultrasound frequency is in the range of from 20 KHz to 30 KHz.

4. A system as claimed in claim 2 in which the object is a human body.

5. A system as claimed in claim 4 in which more than one array of ultrasound receivers is present, each receiver being attached to a different part of the human body.

6. A system as claimed in claim 4 in which programming means are provided to address the sub-region map.

7. A system for converting movement of a human body within a three-dimensional region to music, comprising:

a music synthesizer;

four ultrasound emitters located respectively at four inertial reference points for triagulation determination of positions of parts of the human body;

at least one array of ultrasound receivers attached to a part of the human body to move with the part of the human body in the three-dimensional region;

a pulse detector connected to each array of receivers to detect ultrasound pulses received thereby;

a pulse encoder connected to each detector to encode detected pulses into a form suitable for radio transmission;

a mixer connected to receive output from the encoders;

a radio transmitter connected to the mixer to transmit data corresponding to detected pulses;

a radio receiver remote from each radio transmitter but associated therewith to receive radio data therefrom;

a pulse decoder connected to the radio receiver to decode transmitted pulses into a form suitable for microprocessor detection;

a microprocessor controller interfaced with the decoder for the detection of pulses and interfaced with the ultrasound emitters to initiate emission of ultrasound pulses therefrom, to measure elapsed time between the emission of an ultrasound pulse from respective ultrasound emitters and detected pulses from any one of the ultrasound receivers, to calculate the orientation of the respective body part from elapsed times for pulses between each of the emitters to each of receivers of an array of a respective body part, and to generate position indicating signals of the body part therefrom;

a microcomputer interfaced with the microprocessor controller for receiving said radial position indicating signals therefrom, calculating the three-dimensional position, velocity, and acceleration of the respective body part in the three-dimensional region, and generating commands for the music synthesizer in accordance with a sound map located in memory of the microcomputer and addressed by the position indicating position, velocity, and acceleration data.

8. A system for tracking an object within a three-dimensional region comprising;

at least three ultrasound emitters located respectively at inertial reference points for triangulation determination of a position of said object;

an ultrasound receiver attached to said object to move in the three-dimensional region;

a pulse detector connected to each ultrasound receiver to detect pulses received thereby;

a pulse encoder connected to each detector to encode detected pulses into a form suitable for radio transmission;

a mixer connected to receive output from the encoder(s);

a radio transmitter connected to the mixer to transmit data corresponding to detected pulses;

a radio receiver remote from each radio transmitter but associated therewith to receive radio data therefrom;

a pulse decoder connected to the radio receiver to decode transmitted pulses into a form suitable for microprocessor detection;

a microprocessor controller adapted to send signals to the ultrasound emitters to initiate emission of ultrasound pulses therefrom, to measure elapsed time between the emission of an ultrasound pulse from respective ultrasound emitters and a detected pulse corresponding thereto, to calculate orientation data for the object from the elapsed times for pulses from each of the emitters and the object, and to generate position indicating signals; and computer means interfaced with the microprocessor controller for receiving said position indicating signals therefrom, computing the three-dimensional position, velocity, and acceleration of the object.

* * * * *